United States Patent [19]

Riedl et al.

[11] Patent Number: 4,961,680

[45] Date of Patent: Oct. 9, 1990

[54] DEVICE FOR LIFTING AND DEPOSITING TRANSPORTABLE LARGE CONTAINERS, E.G. COMPARTMENTS OR THE LIKE

[75] Inventors: Reinhold Riedl, Miltenberg; Conrad Lazarus, Freudenberg, both of Fed. Rep. of Germany

[73] Assignee: Haacon Hebetechnik GmbH, Fed. Rep. of Germany

[21] Appl. No.: 798,673

[22] Filed: Nov. 15, 1985

[30] Foreign Application Priority Data

Nov. 20, 1984 [DE] Fed. Rep. of Germany ....... 3442306

[51] Int. Cl.[5] .............................................. B60P 1/12

[52] U.S. Cl. .................................. 414/458; 254/6 R; 220/1.5; 280/43.21; 280/43.23; 410/53; 410/81

[58] Field of Search ............... 414/458, 459, 460, 461, 414/10, 12, 589, 785, 908; 280/43.21, 43.23, 43, 477; 254/6 R, 7 R, 2 R; 187/9 R; 410/45, 53, 80, 81, 66, 83; 24/287; 294/67.1; 206/595

[56] References Cited

U.S. PATENT DOCUMENTS

| | | | |
|---|---|---|---|
| 2,985,482 | 5/1961 | Lion | 220/1.5 |
| 3,140,005 | 7/1964 | Hand | 220/1.5 |
| 3,195,859 | 7/1965 | Jackson et al. | 280/43.21 X |
| 3,570,694 | 3/1971 | Tantlinger | 414/458 |
| 3,631,999 | 1/1972 | Walerowski | 280/43.23 X |
| 4,108,326 | 8/1978 | Bertolini | 220/1.5 |
| 4,148,511 | 4/1979 | Allen et al. | 294/67.1 |
| 4,452,555 | 6/1984 | Calabro | 414/458 |
| 4,516,901 | 5/1985 | Riedl | 414/458 |
| 4,611,816 | 9/1986 | Traister et al. | 414/458 X |

FOREIGN PATENT DOCUMENTS

| | | | |
|---|---|---|---|
| 3305847 | 8/1984 | Fed. Rep. of Germany | 254/6 R |
| 2369202 | 6/1978 | France | 414/458 |
| 2458505 | 2/1981 | France | 414/458 |
| 882129 | 11/1961 | United Kingdom | 414/458 |

*Primary Examiner*—Frank E. Werner
*Attorney, Agent, or Firm*—Frank P. Presta

[57] ABSTRACT

A lifting and depositing device for a large container has connecting longerons which are approximately the height of the container and are attached to the corner fittings of the large container to be raised and lowered. The connecting longerons are arranged at the corners of the large containers and, at the bottom ends at some distance to the side, they support at least one more connecting longeron for an overhang beam of a rack and pinion jack. The rack and pinion jack can be raised and lowered along upright, at the bottom ends of which are arranged pairs of wheels. In order to be able to adjust the pairs of wheels in a simple manner to different track gauges (narrow and wide), the overhang beam can be attached either to the connecting longeron which is approximately the height of the container or to the additional connecting longeron.

8 Claims, 7 Drawing Sheets

DEVICE FOR LIFTING AND DEPOSITING TRANSPORTABLE LARGE CONTAINERS, E.G. COMPARTMENTS OR THE LIKE

BACKGROUND OF THE INVENTION

The present invention relates to a lifting and depositing device for transportable large containers, e.g. compartments or the like, with connecting longerons for the overhang beams which are approximately the height of the container, which can be attached perpendicular to the corner fittings of the large container, which carry rack and pinion jacks or the like, of which the winches or the like are provided on uprights for the large containers which can be raised and lowered along each upright, and the uprights can also have wheels.

A movable lifting and depositing device for transportable large containers is already known from German DE-OS No. 32 26 882. Here, however, in order to be able to adjust the wheels at the bottom ends of the uprights, or only the uprights, dependent upon the relevant loading conditions, to different width track gauges or spacings, additional reinforcements are required in the area of the overhang beams, and also the time required for attachment and detachment of the rack and pinion jack to and from a large container is correspondingly increased. Further time is required in that, for example, the connecting longerons and rack and pinion jacks must be turned around for lifting a large container from a truck and subsequent setting of the wheels on "narrow gauge".

SUMMARY OF THE INVENTION

The object of the invention is to provide a lifting and depositing device for transportable large containers, wherein, at low structural cost, simple and time-saving arrangements can be used for adjustment of the wheels or only the uprights for adaptation to track gauges or upright settings with different spacings.

This is attained according to the invention in that the connecting longerons are arranged each at a corner of the large container, and at some distance from their bottom ends they support at the side at least one more shortened, perpendicular connecting longeron for the overhang beam of a rack and pinion jack. At each corner of the container, then, the rack and pinion jacks can be attached simply and rapidly by their overhang beams in one of three different positions, and can be turned around, so that different track gauges or positions for the wheels or uprights can be obtained. Thus, the attached connecting longerons could advantageously leave the container corner as it was, unchanged in its attachment positions. The additional shortened connecting longerons represent simple structural parts, which likewise can be simply connected with their relevant connecting longerons which are approximately the height of the container.

One essential advantage of the invention resides in that the turning around of the rack and pinion jack on the container corners takes less time than in the traditional state of the art. Such a turning around, for instance, can be required if a large container is to be removed from a truck and be placed on the ground and then is to be moved over an oblique ramp into the cargo space of a cargo plane. This requires adjustment of the wheels to a "narrow gauge". Also, an adjustment of the wheels for movement of the large container transverse to its lengthwise axis is possible with minimum time lost.

The connecting longerons also remain in the attached position for this operation.

In accordance with one configuration of the invention, the shortened connecting longeron can be arranged in such a manner on the connecting longeron, which is approximately the height of the container, that it lies facing a lengthwise side of the large container or else facing a narrow side of the large container.

According to another configuration of the invention, if the connecting longeron, which is approximately the height of the container, carries two shortened connecting longerons in a right-angle arrangement, so that one of them lies opposite a lengthwise side and the other opposite a narrow side of the large container, then there is an increased number of different attachment options of the rack and pinion jacks to each container corner, and the wheels can thus be adjusted to further different gauges simply and without wasting time on further mutual adjustments.

According to still another embodiment of the invention, if the shortened connecting longerons are attached by their ends to support arms, which are detachably attached to the connecting longeron which is approximately the height of the container, e.g. by means of fastening bolts, the advantage is attained that fewer bulky parts need be used for attachment of the lifting and depositing device to a large container.

Another configuration of the invention is characterized in that the support arms are configured telescopically, in order to vary the side distance between the connecting longerons. The rack and pinion jacks and therefore also the uprights with wheels can thus be attached in still more different positions to the container corners, which results in still more different track gauges. This is also possible according to another variation of the invention, if the shortened connecting longerons are axially adjustable between each two support arms.

According to still another configuration of the invention, if the bottom end of the connecting longeron, which is approximately the height of the container, is fastened over two support arms which are arranged at a right angle to the connecting longeron, then these support arms advantageously fulfill two functions, wherein they are tightened for the fixing of the bottom end of the connecting longeron which is approximately the height of the container to the large container, and also they replace the special structural connection part which is normally required.

BRIEF DESCRIPTION OF THE DRAWINGS

The invention is to be explained hereinafter relative to the drawings of exemplary embodiments. They show.

DESCRIPTION OF THE PREFERRED EMBODIMENT

Figure 1:
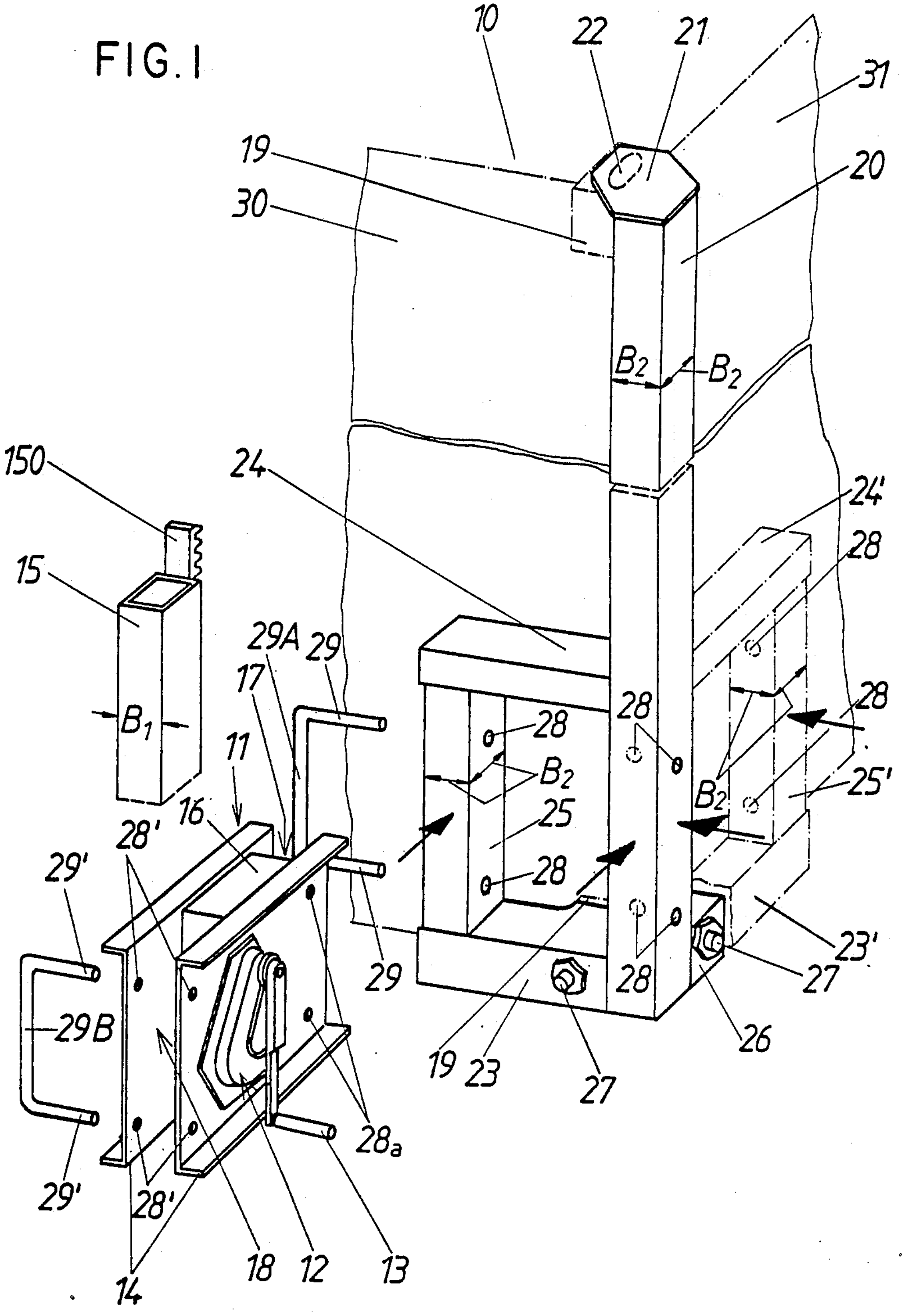
FIG. 1 is a perspective and exploded view of a connecting longeron of approximately the height of the container, attached to a container corner, which to the side (to the left) supports another shortened connecting longeron, and the broken lines show also a second shortened connecting longeron and a rack and pinion jack with overhang beam before its attachment to one of the connecting longerons, as well as a part of an upright with rack.

The movable lifting and depositing device, of which only the part associated with the four container corners is shown in FIGS. 1–8, is intended for a large container 10 (e.g. a container, compartment or the like) of generally rectangular section. The four parts of the lifting and depositing device are identical. These large containers 10 are to be lifted e.g. from the ground to a cargo plane, a truck or the like, to be moved, and then to be moved over an oblique ramp to its loading surface and finally to be deposited. If instead of an oblique ramp, only a horizontal loading ramp, or a plank bed or the like (with rollers) is present at the level of the loading space floor or the transfer plane, then large container 10 is lifted by the lifting and depositing device, and moved until it can be deposited on this loading ramp.

The projected work processes could also be carried out in reverse order, if indeed a large container is to be unloaded from a cargo plane or even from a truck. With such a lifting and depositing device, furthermore, the large container 10 must also be able to be moved into the cargo space of the aircraft or other transport means, if no rollers are present on the floor of the cargo space. To carry out the described different work processes, the rack and pinion jacks must be attached to the corners of the containers in different positions, so that the wheels associated with them can be adjusted to different relevant spacing and/ or track gauges. Thus, for instance, the setting of the wheels on a "narrow gauge" is required when the large container is to be moved over an oblique ramp into the cargo space of a cargo plane. The depositing of the large container on a horizontal loading ramp at the level of the loading or cargo space floor on the other hand requires adjustment of the wheels to "wide gauge". Furthermore, in certain cases, additional attachment positions are required for the rack and pinion jacks on the container corners, e.g. for adjustment of the large container transverse to its lengthwise axis.

For this purpose, the movable lifting and depositing device has four structurally identical overhang beams 11 to be fastened detachably to the corners of large container 10, which also carry a rack and pinion jack 12, which can be operated by a hand crank 13. Each overhang beam 11 is of a structure known from German Utility Model No. 82 35 609.2, which includes two plates 14 with a U-shaped transverse section profile which is open to the outside. Plates 14 are connected in the spacing of the width B 1 (FIG. 1) of an upright 15 which consists of a rectangular pipe, with the aid of one or more spacers 16. An upright 15 to which a rack 150 is fastened concentrically is associated with each overhang beam 11. Plates 14 are welded with their flat-surfaced sides to the spacers 16, in such a manner that a vertical attachment space 17 is present at one end of overhang beam 11 and at the opposite end, facing winch 12, is a vertical guide space 18 for upright 15. If upright 15 is introduced into this guide space 18, its rack 150 is in engagement with the drive (not shown) of rack and pinion jack 12.

At the top and bottom of each corner of large container 10 are provided standard corner fittings 19, to which a connecting longeron 20 of approximately the container height can be attached to a large container 10 at the corners and with some spacing. Connecting longeron 20 comprises a rectangular pipe and, at its top end, supports an overhang beam 21, to which is fastened a lug 22 for connection with top corner fitting 19. At the bottom end of each connecting longeron 20 are found two horizontal support arms 23, 24, arranged with vertical spacing from one another, and attached e.g. by welding, and between their ends is fastened another shortened, perpendicular connecting longeron 25. At the bottom end of connecting longeron 20 is also mounted a flange 26, at a right angle to support arm 23, which identical to support arm 23, is provided with boreholes for the passage of tightening screws or bolts 27, which are to be connected with the bottom corner fitting 19 at each container corner.

Figure 2:
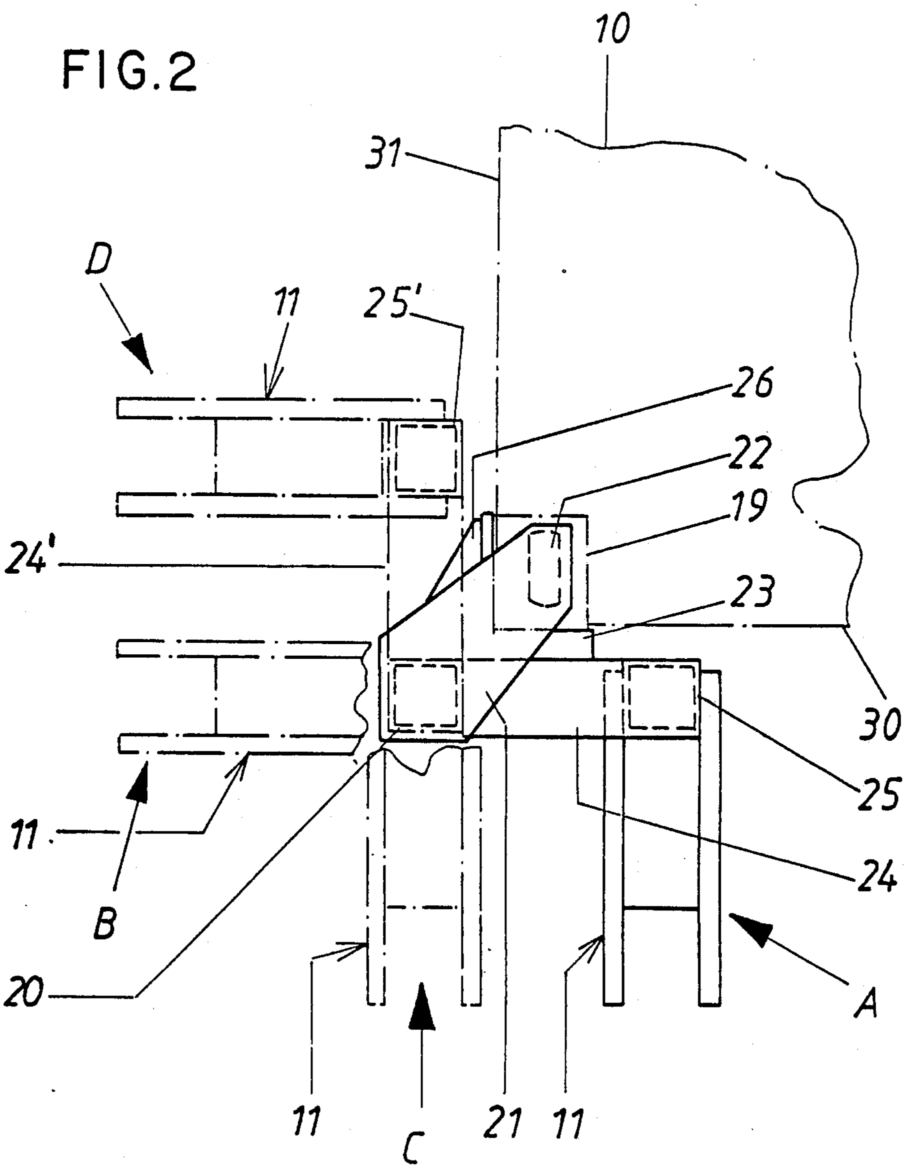
FIG. 2 is a plan view of a container corner with a connecting longeron arrangement as in FIG. 1, in which different structural possibilities of attachment A-D for the overhang beam supporting the rack and pinion jack are shown in broken lines.

In FIGS. 1 and 2, the flange 26 can also be replaced by a support arm 23' corresponding to support 23 and, furthermore, it can be fastened to connecting longeron 20 at a right angle to support arm 24 at the same level, in order to provide another connecting longeron 25' at some distance to the side of connecting longeron 20, which is fastened between the free ends of support arms 23' and 24'. The shortened connecting longerons 25 and 25' likewise consist of rectangular pipes with a cross section which corresponds to that of connecting longeron 20 which is approximately the height of the container. On the other hand, the edge dimensions B 2 of (FIG. 1) of connecting longeron 20, 25 and 25' are identical to the width B 1 of upright 15. The vertical spacing of support arms 23, 24 or 23' is slightly greater than the structural height of overhang beam 11.

Overhang beam 11 with rack and pinion jacks 12 can be attached dependent upon the conditions at the loading or unloading site, as desired, to connecting longerons 20, 25 or 25' at each container corner. The extent of attachment space 17 is indeed identical to the edge dimensions B 2 of the connecting longerons, so that with the attachment of an overhang beam 11 to each container corner, the overhang beam 11, adapting to its attachment space 17, moves over one of the connecting longerons 20 or 25 or 25', and the relevant connecting longeron fills the U-shaped small section of attachment space 17. Four different attachment possibilities A–D for overhang beam 11 with rack and pinion jack 12 at each container corner are shown partially in FIG. 2 in full and, for the most part, in broken lines.

Horizontal boreholes 28 are found on connecting longerons 20, 25 and 25' at the four corners of large container 10, with corresponding vertical spacing, and both arms 29 of U-shaped bracket 29 A can be passed through said boreholes when an overhang beam 11 is to be attached. Plates 14 of each overhang beam 11, likewise at a corresponding vertical spacing to the side, have boreholes 28*a* aligned for the passage of arm 29 of U-shaped bracket 29 A. Following the introduction of an overhang beam 11 on one of the connecting longerons 20, 25 or 25' (see arrows, FIG. 1) and alignment of the aforementioned boreholes in the relevant connecting longeron and in plates 14, the U-shaped bracket 29 A is inserted from the side with its arms 29 through the boreholes, and overhang beam 11 is detachably fastened to that container corner. To hold it in position, split pins (not shown) or other suitable means can be fastened onto arms 29.

Connecting longeron 20 and 25 can be attached to each container corner in such a manner that, as shown in FIGS. 1–5, the shortened connecting longeron 25 lies opposite the narrow side 30 of large container 10. In the embodiment with two shortened connecting longerons 25, 25′, therefore, the connecting longeron 25′ is found opposite a lengthwise side 31 of large container 10. The possibilities of connection for overhang beam 11 for the purposes of adjustment of wheels 32 to different track gauges are still to be described.

Figures 3, 4:
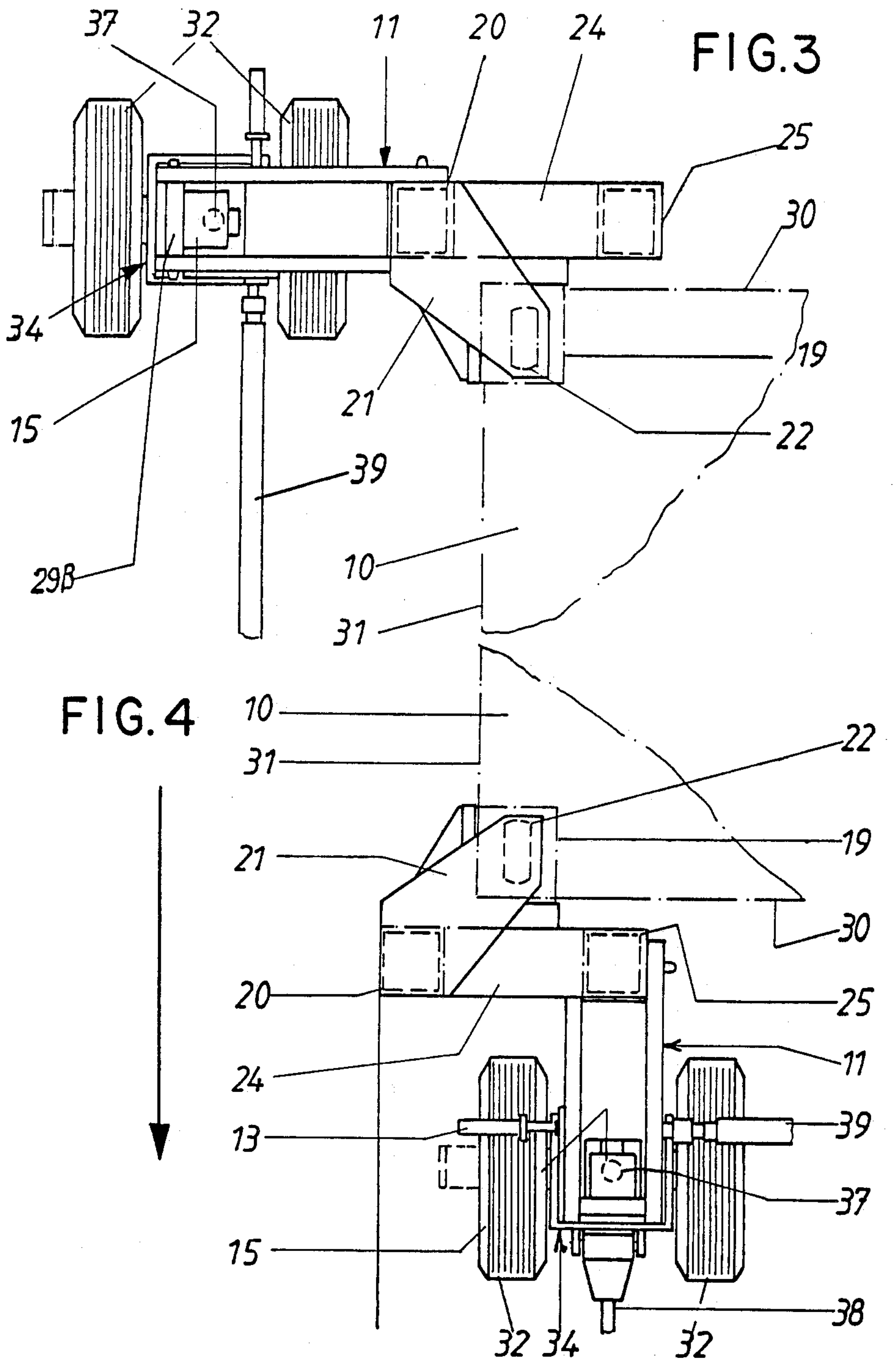
FIGS. 3, 4 and 5 each are plan views of a container corner with a differently structural rack and pinion jack, including its associate wheels.
Figure 6:
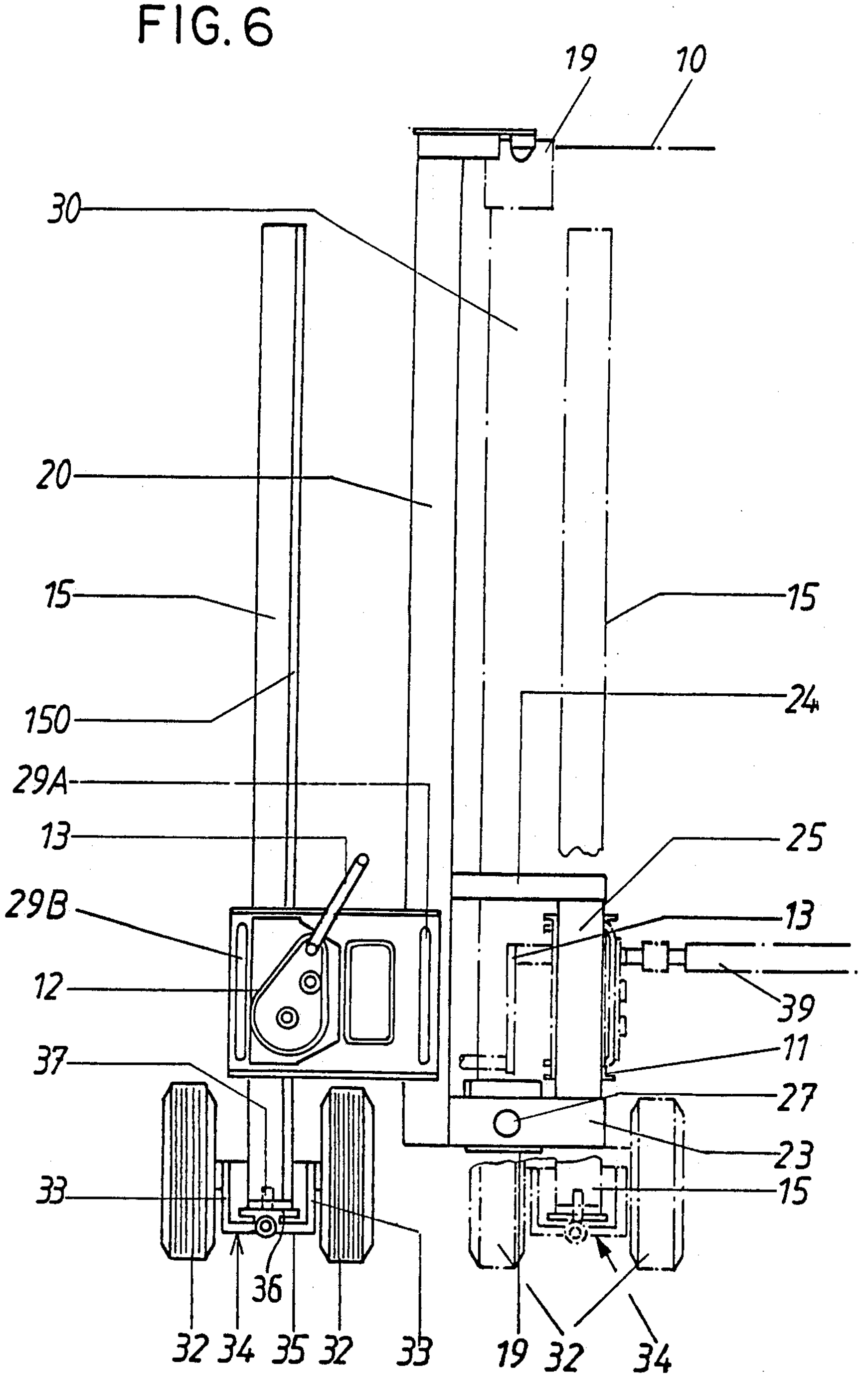
FIG. 6 is a partial front elevational view of a large container in the area of one corner, showing in full and in broken lines, a rack and pinion jack with associated upright and wheels in different attachment positions.
Figure 7:
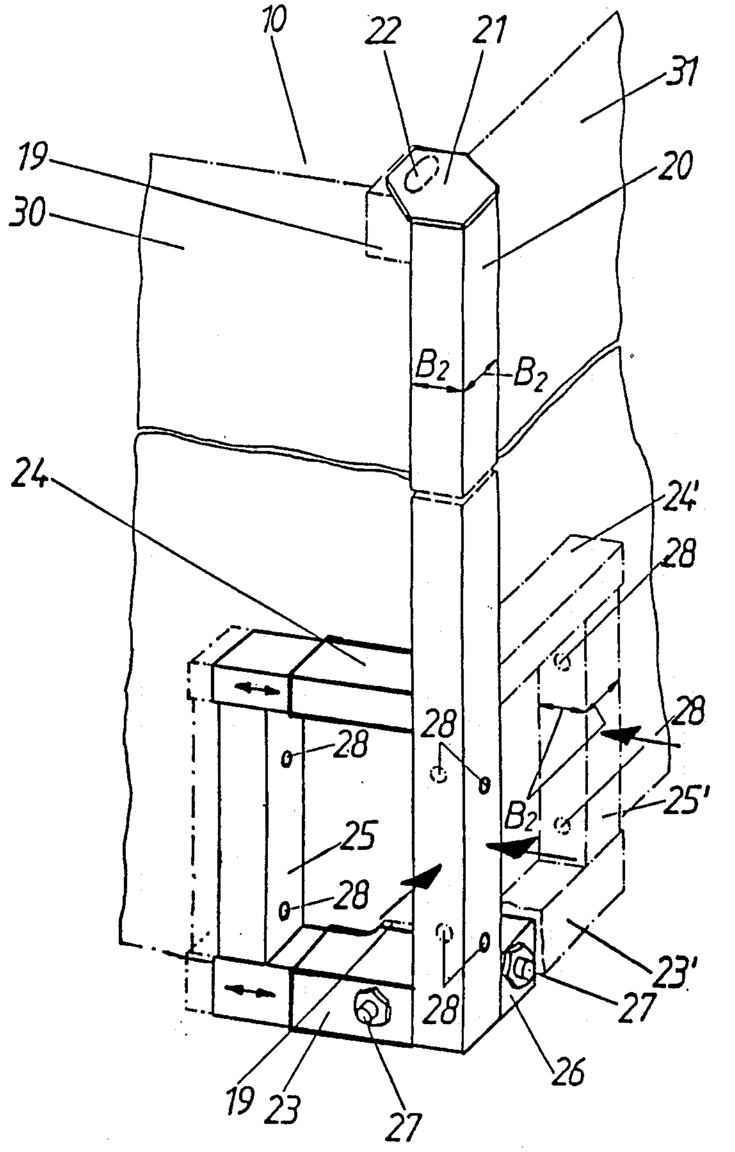
FIGS. 7 and 8 are perspective views similar to FIG. 1 showing the telescoping arrangement of the support arms and vertical adjustment of the second shortened connecting longeron, respectively.

If a larger container 10 placed, e.g., on the ground is to be loaded in or onto a transport at some point removed from it, e.g. a cargo plane, over an oblique ramp by means of the movable lifting and depositing device, then overhang beam 11 is attached to the shortened connecting longerons 25 at each container corner as shown in FIGS. 1 and 4, and in full lines in FIG. 2 at A and in FIG. 6 in broken lines. The four overhang beams 11 extend in these positions parallel to the lengthwise axis of large container 10. Finally, the wheels 32 are arranged in pairs beneath guide spaces 18 for uprights 15. Wheels 32 of each pair are mounted concentrically on arms 33 of a wheel support 34 of U-shaped cross section (FIG. 6).

On the horizontal crossbar 35 of each wheel support 34 is mounted a rocker 36, which is intended for superpositioning of the bottom end of an upright 15. Rocker 36 supports a guide 37, which fits in an axial borehole in the bottom end of upright 15 when upright 15 is placed there following attachment of each of the pairs of wheels and introduction of uprights 15, for holding uprights 15 in each guide space 18, and a bracket 29 B corresponds to the aforementioned U-shaped bracket 39 A, with its arms 29′ inserted throught aligned side boreholes 28′ into plates 14 and held in structural position by split pins (not shown) or the like.

When uprights 15 and wheels 32 are attached to all four overhang beams 11 as described above, the rack and pinion jacks 12 are operated by rotation of hand crank 13, in order to lift the four overhang beams 11 and therewith the large container 10 on uprights 15 into travel position as in FIG. 6, in which a certain play is present between wheels 32 and the bottom of overhang beam 11 or winch 12, which facilitates rotation of the two front pairs of wheels 32 around the axis of upright 15 or guide 37 for steering purposes. The two following pairs of wheels are prevented from rotating. A traction and steering rod is associated with the front steering pair of wheels, as shown partially in FIG. 4 at 38, and is connected universally with wheel supports 34 of the front wheel pairs.

In order to require only two rack and pinion jacks 12 for lifting large container 10, each two side adjacent rack and pinion jacks 12 are drive-connected with each other, by shafts 39.

In another exemplary embodiment, when large container 10 is to be deposited on a higher horizontal loading ramp of a transport means, it is necessary to adjust the pairs of wheels to "wide gauge" as is shown in FIG. 3 and in full lines in FIG. 6. Overhang beams 11 for this purpose are attached to connecting longeron 20 in such a manner that they extend parallel to narrow side 30 of large container 10 in the attachment positions B and D as shown in FIG. 2. When wheel supports 34 then are introduced under overhang beams 11 and are coupled with uprights 15, then rack and pinion jacks 12 are likewise operated, in order to lift overhang beams 12 and therewith large container 10 into the travel position, in which first of all the pair of wheels are rotated 90° in the direction of forward movement (FIG. 3 and 6). After attaining the horizontal loading ramp, large container 10 is raised until it can be moved over this ramp, and uprights 15 are still at a certain side distance from the loading ramp. Then large container 10 is deposited on the loading ramp and the lifting and depositing device is disassembled, so that the large container can be introduced from the loading ramp into the relevant cargo space over rollers on the bottom.

Figure 5:
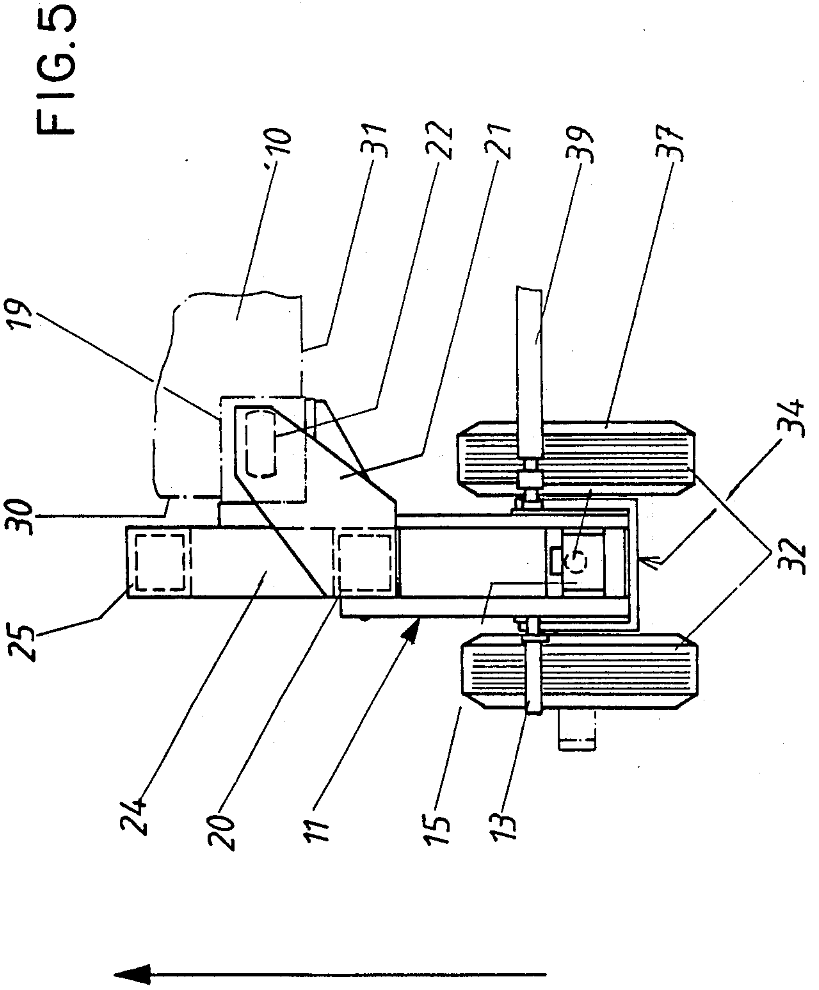

In the cases when it is necessary to move a large container 10 transverse to its lengthwise axis, the pairs of wheels according to the couplings of their wheel supports 34 are found already in the direction of forward movement shown in FIG. 5 (the aforementioned 90° rotation of the pair of wheels is omitted in this case).

Other embodiments of overhang beams 11 on connecting longerons 20 or 25′ are shown in FIG. 2 at C and D. Assembly C shows a somewhat greater side spacing of the pairs of wheels than assembly A, and assembly D likewise allows a "wide gauge" for the pair of wheels, and also here it is possible to move large container 10 in the direction of its lengthwise axis and transverse to its lengthwise axis as in assembly version B. Variation D, however, requires the second shortened connecting longeron 25′, shown in broken lines in FIG. 1.

Support arms 23, 24 or 23′, 24′ could also be detachably fastened to connecting longeron 20, e.g. by means of fastening bolts (not shown), which can be introduced through boreholes in flanges on connecting longeron 20. Thus, the lifting and depositing device is attached to a larger container 10 using fewer cumbersome structural parts.

Figure 8:
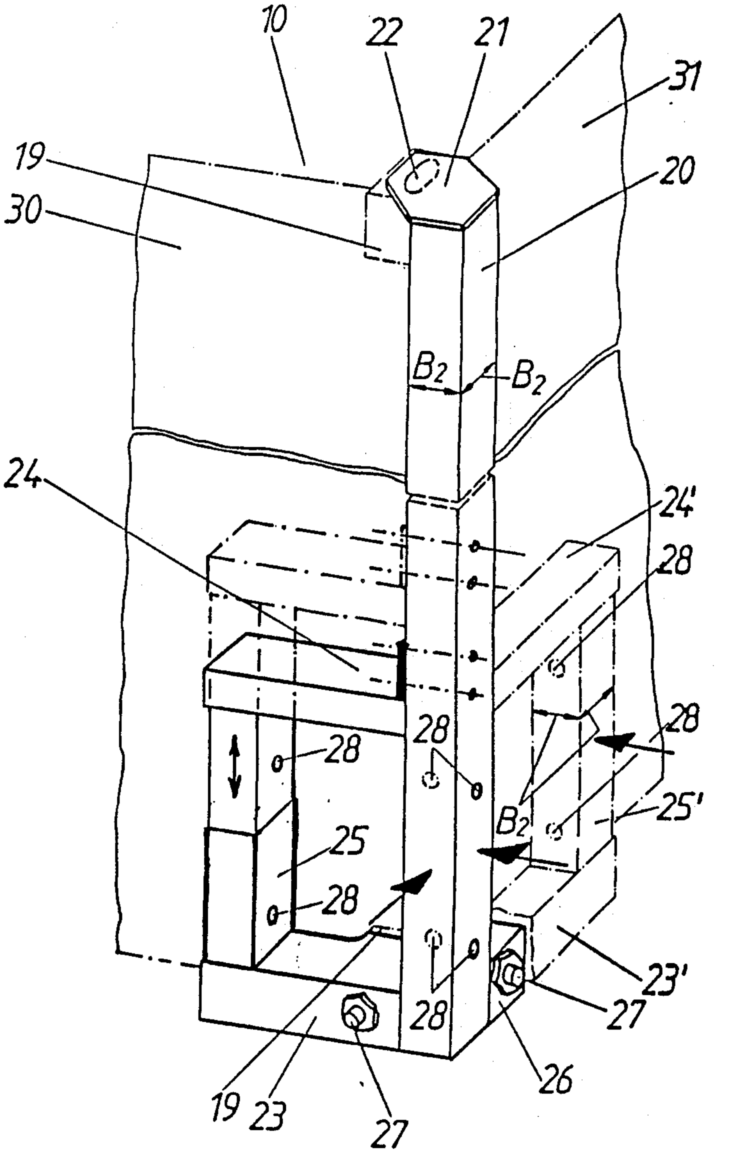

Additional track gauges for the pairs of wheels can then be set, if support arms 23, 24 or 23′, 24′ are configured telescopically (FIG. 7), or shortened connecting longerons 25, 25′ are arranged between support arms 23, 24, 23′, 24′ adjustable in the axial direction (FIG. 8).

We claim:

1. Lifting and depositing device for transportable large containers, with first connecting longerons for overhang beams, which can be attached perpendicular to the corner fittings of the large container, which are approximately the height of the container, and which carry rack and pinion jacks having winches that are provided on uprights for the large containers and which can be raised and lowered along each upright, the uprights having wheels, characterized in that the first connecting longerons (20) are arranged at the corners of the large container (10), a pair of laterally extending support arms (23,24) are secured to the lower end portion of each first connecting longeron in vertically spaced relation, and a second connecting longeron (25) extends upwardly between said support arms and is connected thereto, said second connecting longeron being spaced from and being shorter than said first connecting longeron, and said second connecting longeron having means for supporting the overhang beam (11) of a rack and pinion jack (12).

2. Device as in claim 1, characterized in that the second connecting longeron (25') is arranged on the first connecting longeron (20) in such a manner that it faces a lengthwise side (31) of the container (10).

3. Device as in claim 1, characterized in that the second connecting longeron (25) is arranged on the first connecting longeron (20) in such a manner that it faces a narrow side (20) of the container (10).

4. Device as in claim 1, characterized in that the first connection longeron (20) supports two second connecting longerons (25, 25') in a substantially right angle arrangement, as that one second longeron (25') faces a lengthwise side (31) of the container (10) and the other second longeron (25) faces a narrow side (30) of the container (10).

5. Device as in claim 4, characterized in that the second connecting longerons (25, 25') are fastened with their ends on support arms (23, 24; 23', 24'), which are detachably fastened to the first connecting longeron (20).

6. Device as in claim 5, characterized in that the support arms are configured to be telescopic, in order to vary the side spacing between the connecting longerons.

7. Device as in claim 5, characterized in that the second connecting longerons are arranged axially adjustably between each two support arms.

8. Device as in claim 4, characterized in that the bottom end of the first connecting longeron (20) is fastened over two support arms (23, 23') arranged at substantially right angles to the first connecting longeron (20) for the second connecting longerons (25, 25') at the bottom corner fitting (19) of the container (10).

* * * * *